United States Patent [19]

Leber et al.

[11] Patent Number: 4,923,497
[45] Date of Patent: May 8, 1990

[54] METHOD FOR THE CONTINUOUS PRODUCTION OF A TUBE OR ROD OF VITREOUS FUSED SILICA

[75] Inventors: Helmut Leber, Hanau; Nigel R. Whippey, Seligenstadt, both of Fed. Rep. of Germany

[73] Assignee: Heraeus Quarschmelze GmbH, Hanau, Fed. Rep. of Germany

[21] Appl. No.: 312,258

[22] Filed: Feb. 17, 1989

[30] Foreign Application Priority Data

May 10, 1988 [DE] Fed. Rep. of Germany ....... 3815974

[51] Int. Cl.$^5$ ................. C03B 15/14; C03B 21/06
[52] U.S. Cl. ............................... 65/86; 65/32.5; 65/61; 65/111; 65/DIG. 4; 65/DIG. 9
[58] Field of Search ............... 65/31, 32.5, 61, 66, 65/86, 111, 157, 187, 191, 134, 374.12, DIG. 4, DIG. 8, DIG. 9

[56] References Cited

U.S. PATENT DOCUMENTS 2,155,131  3/1938  Hänlein .
3,109,045 10/1963  Silverman ................. 65/32.5 X
3,328,149  6/1967  Keefer ....................... 65/DIG. 4
3,429,972  2/1969  LeClerc et al. .............. 65/DIG. 4
3,764,286 10/1973  Antczak et al. ............. 65/DIG. 9

FOREIGN PATENT DOCUMENTS 264639  4/1966  U.S.S.R. .................... 65/DIG. 8

OTHER PUBLICATIONS

Manufacture of Fused Silica Glass Tubing and Rod "Glass", Nov. 1972, pp. 337, 338.

Primary Examiner—Robert L. Lindsay
Attorney, Agent, or Firm—Felfe & Lynch

[57] ABSTRACT

A method for the continuous production of a tube or rod of vitreous fused silica. Silicon dioxide in particle form is heated in a crucible to the softening temperature and is withdrawn contiuously downward from a bottom outlet opening in which a shaping tool is disposed. In the annular space between the shaping tool and the bottom outlet opening the softened silicon dioxide is subjected to an electrical field. In the closed crucible, a hydrogen-containing atmosphere with a hydrogen content of at least 80% is sustained above the silicon dioxide and in the space underneath the crucible that adjoins the shaping region.

4 Claims, 1 Drawing Sheet

U.S. Patent   May 8, 1990   4,923,497
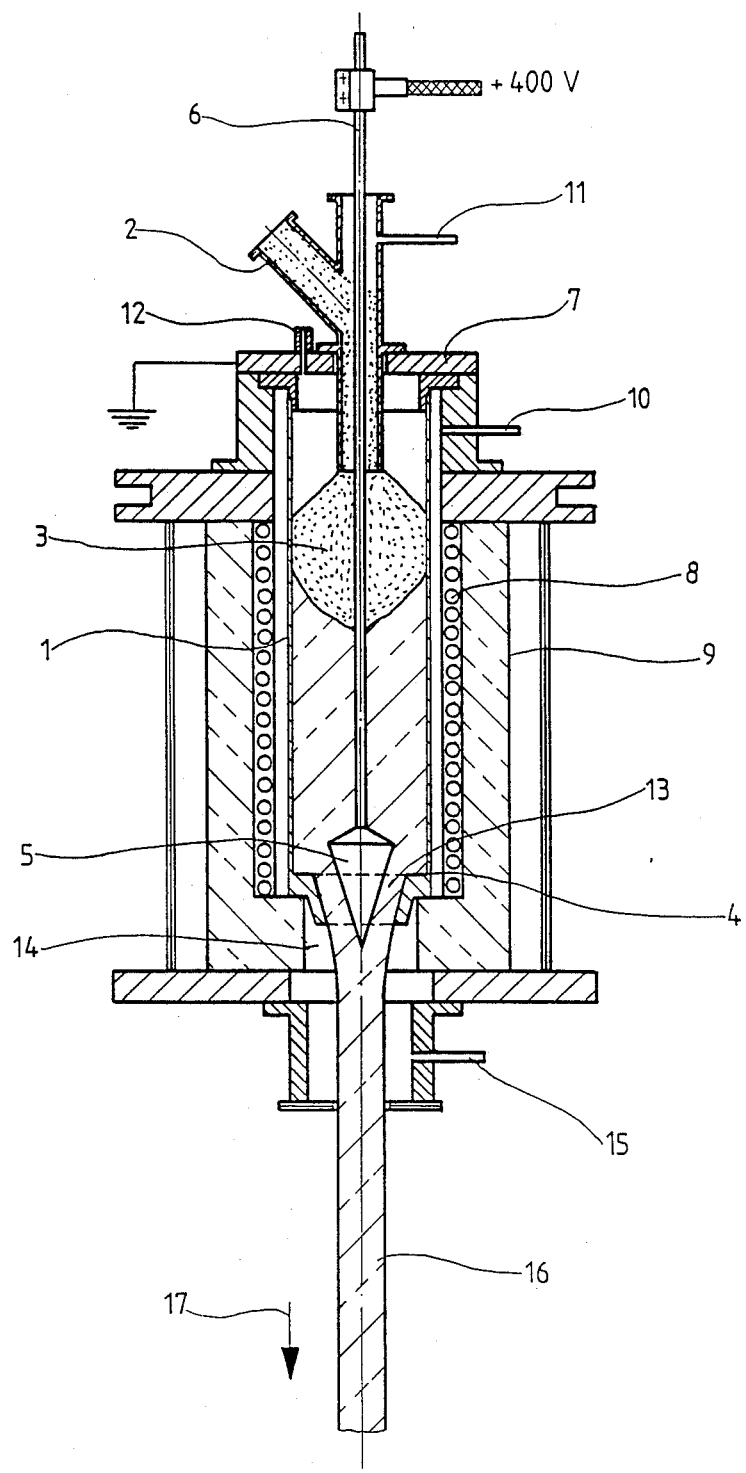

METHOD FOR THE CONTINUOUS PRODUCTION OF A TUBE OR ROD OF VITREOUS FUSED SILICA

The invention relates to a method for the continuous production of a tube or rod of vitreous fused silica by heating particulate silicon dioxide to softening temperature in a crucible of a high-melting material, especially one which consists substantially of tungsten or molybdenum, having a bottom outlet in which a shaping tool is disposed, and by continuously drawing the softened silicon dioxide downwardly through an annular space formed between the bottom outlet and the shaping tool, while a hydrogen-containing atmosphere is sustained in the crucible above the silicon dioxide and in the space below the crucible adjoining the shaping region.

Methods of the kind described above are disclosed in U.S. Pat. No. 2,155,131. In a known method, a hydrogen-containing atmosphere consisting of 20% hydrogen and 80% nitrogen is sustained in the crucible above the silicon dioxide and below the crucible. The vitreous fused silica tubes thus produced are free of air bubbles and very clear, and they are characterized by uniform wall thicknesses.

Fused vitreous silica products which are used as semi-manufactures for the production, for example, of optical fibers or for the production of apparatus parts in the semiconductor industry, are subject to ever more stringent purity requirements, and these high purity requirements have to do with alkali impurities in the glass.

It is an object of the invention to provide a method for the continuous production of rods or tubes of vitreous fused silica whose content of lithium impurities is reduced to levels on the order of 1/10 ppm and less.

This object is accomplished in accordance with the invention as described herein.

An atmosphere with a hydrogen content of at least 80% is used, and between the shaping tool and crucible such an electrical potential is sustained in such a manner that the electrical field is directed from the shaping tool to the crucible, and the electrical current intensity amounts to at least 0.7 mA per cm$^3$ per minute of the time during which the softened silicon dioxide remains in the electrical field.

It has been found desirable to heat the particulate silicon dioxide to a temperature ranging from 1900° C. to 2300° C. and to maintain a potential ranging from 200 V to 600 V. A mixture of hydrogen and helium in which the hydrogen content of the mixture amounts to at least 85% has proven to be an especially desirable hydrogen-containing atmosphere for this purpose. After the rod or tube of vitreous fused silica has cooled, its outer layer is preferably removed to a depth of 2 mm.

By maintaining the hydrogen-containing atmosphere in the crucible the hydrogen is made to fill the interstices present between the particles of silicon dioxide, and thus it becomes incorporated into the silicon dioxide heated to the softening temperature. Since hydrogen diffuses very easily into silicon dioxide, its absorption is thereby especially facilitated. The silicon dioxide heated in the crucible to softening temperature flows out of the crucible through the annular space between the bottom outlet and the shaping tool and is drawn downwardly. Within the annular space the softened silicon dioxide is subjected to an electrical field. Since the electrical field is directed, in accordance with the invention, from the shaping tool to the crucible, the impurity ions contained in the heated silicon dioxide migrate to the respective electrodes and concentrate at the surface of the vitreous fused silica. The high-melting material of the shaping tool preferably is the same material that is used, for example, as crucible material in the method in accordance with the invention, that is to say, the tools preferably consist essentially of tungsten or molybdenum. The incorporation of hydrogen into the silicon dioxide largely prevents the undesirable anodic oxidation that occurs at the anode, which is the shaping tool, so that the penetration of anode oxidation products into the softened silicon dioxide is virtually entirely prevented. The alkali ions present as impurities in the particulate silicon dioxide used as starting material migrate toward the cathode, which is the bottom outlet of the crucible.

The method in accordance with the invention has been found to be advantageous due to the fact that in the case of particulate silicon dioxide contaminated with about 1 ppm of lithium, the lithium contamination was reduced to about 0.01 ppm, i.e., by virtually two orders of magnitude. Similar results were also obtained in regard to sodium and potassium impurities. For example, sodium contamination of 1.35 ppm was also reduced to 0.01 ppm, and a potassium contamination of 0.1 ppm was reduced to about 0.03 ppm. Also other impurities, such as iron and copper contained in the starting material of the particulate silicon dioxide, were likewise reduced. Surprisingly, it was also found that the tubes and rods made by the method of the invention were improved in regard to residual fine bubble content; the tubes and rods had a lower residual fine bubble content than tubes and rods made in accordance with the state of the prior art. Vitreous fused silica tubes manufactured in accordance with the invention also had a higher thermal stability than those made by conventional methods, i.e., at elevated temperatures they did not deform until after exposure for a longer period to these temperatures than tubes made by the method of the state of the prior art.

In accordance with the invention, a method for the continuous production of a tube or rod from vitreous fused silica comprises heating particulate silicon dioxide to softening temperature in a crucible of high-melting material having a bottom outlet opening. The method includes disposing a shaping tool in the opening and continuously drawing down the softened silicon dioxide through an annular space formed between the bottom outlet opening and the shaping tool, while maintaining a hydrogen-containing atmosphere having a content of at least 80% hydrogen in the crucible above the silicon dioxide and in a space below the crucible adjoining the annular space. The method also includes maintaining between the shaping tool and crucible such an electrical potential difference in such a manner that the electrical field is directed from the shaping tool to the crucible and the electrical current intensity is at least 0.7 mA per cm$^3$ per minute of the time the softened silicon dioxide remains in the electrical field.

For a better understanding of the invention, together with other and further objects thereof, reference is made to the following description, taken in connection with the accompanying drawings, and its scope will be pointed out in the appended claims.

Referring now to the drawing, the Fig. is a sectional view, partly diagrammatic, of apparatus for practicing the method for the continuous production of a tube or rod of vitreous fused silica in accordance with the invention.

Referring now more particularly to the drawing, silicon dioxide 3 in particle form is continuously fed through a feed tube 2 into a crucible 1 made, for example, of tungsten. The crucible 1 has a bottom outlet opening 4 into which extends a shaping tool 5 which is held on a rod 6. The crucible 1 is closed off from the outside by a cover 7 through which the feed tube 2 carrying the particulate silicon dioxide into the crucible extends. Heating to the softening temperature preferably is performed in this embodiment by a resistance heating coil 8 disposed around the crucible at a short distance therefrom. This coil is protected on the outside by the thermal insulation 9. An induction heating coil can, of course, be used instead of the resistance heating coil 8. The space between the resistance heating coil 8 and crucible 1 preferably is flooded with an argon-hydrogen mixture consisting, for example, of 90% argon and 10% hydrogen. The argon-hydrogen mixture is fed through a connection 10 and exhausted through a connection, not shown, at the bottom end of the crucible. The shaping tool 5 is, for example, at a positive potential, of +400 V in this embodiment. The crucible 1 is connected to the ground potential by the cover 7. To maintain a hydrogen-helium atmosphere in the crucible 1, a mixture is used in the embodiment, which consists of 90% hydrogen and 10% helium. This mixture is fed through the connection 11 and exhausted through the connection 12 in the cover 7. This assures that the desired hydrogen-containing atmosphere will always be maintained in the crucible 1. The finely divided silicon dioxide 3 is then heated in the crucible 1 to a temperature of about 2100° C. to 2200° C. The softened silicon dioxide flows through the annular space 13 which is formed between the shaping tool 5 and the bottom outlet opening 4. In the space 14 that adjoins the shaping region and is situated below the crucible, a hydrogen-containing atmosphere is also maintained. In this embodiment a helium-hydrogen atmosphere is used. This helium-hydrogen mixture containing 90% hydrogen and 10% helium is fed through the connection 15. The vitreous fused silica 16 is pulled downwardly as indicated by arrow 17. The rate at which the rod 16 of vitreous fused silica is pulled down amounts in this embodiment to 4 meters per hour. The diameter of the vitreous fused silica rod in the embodiment amounts to 80 mm. Rods are severed in the desired length from the cooled vitreous fused silica 16, as indicated by arrow 17.

Vitreous fused silica rods or tubes made in accordance with the invention preferably are also etched with hydrofluoric acid at their exterior surface, to a depth of no more than 2 mm. This etching removes any alkali impurities which have been concentrated in this surface layer by the method in accordance with the invention. Other methods of removal, such as grinding, can also be used instead of etching.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A method for the continuous production of a tube or rod from vitreous fused silica comprising:

heating particulate silicon dioxide having an impurity content to softening temperature in a crucible of high-melting material, having a bottom outlet opening;

disposing a shaping tool in said opening;

continuously drawing down the softened silicon dioxide through an annular space formed between the bottom outlet opening and the shaping tool, while maintaining a hydrogen-containing atmosphere having a content of at least 80% hydrogen in the crucible above the silicon dioxide and in a space below the crucible adjoining the annular space; and reducing the impurity content of the softened silicon dioxide during its passing through the annular space by maintaining between the shaping tool and crucible such an electrical potential deference in such a manner that the electrical field is directed from the shaping tool to the crucible, and the electrical current intensity is at least 0.7 mA per cm$^3$ per minute of the time the softened silicon dioxide remains in the electrical field.

2. A method in accordance with claim 1, which includes heating the particulate silicon dioxide to a temperature in the range from 1900°C. to 2300°C. and maintaining a potential deference in the range of 200 V to 600 V.

3. A method in accordance with claim 1, in which maintaining a hydrogen-containing atmosphere includes using an atmosphere of a hydrogen-helium mixture, its hydrogen content amounting to at least 85%.

4. A method in accordance with claim -,1 which includes, after the tube or rod of vitreous fused silica has cooled, removing its outer layer to a depth of 2 mm.

* * * * *